(12) United States Patent
Mäker et al.

(10) Patent No.: US 10,227,545 B2
(45) Date of Patent: Mar. 12, 2019

(54) ADDITIVES FOR OILFIELD AND INDUSTRIAL APPLICATIONS

(71) Applicant: EMERY OLEOCHEMICALS GMBH, Düsseldorf (DE)

(72) Inventors: Diana Mäker, Mettmann (DE); Heinz Müller, Monheim (DE)

(73) Assignee: Emery Oleochemicals GmbH, Düsseldorf (DE)

( * ) Notice: Subject to any disclaimer, the term of this patent is extended or adjusted under 35 U.S.C. 154(b) by 0 days.

(21) Appl. No.: 15/533,678

(22) PCT Filed: Jan. 7, 2015

(86) PCT No.: PCT/EP2015/050162
§ 371 (c)(1),
(2) Date: Jun. 7, 2017

(87) PCT Pub. No.: WO2016/110322
PCT Pub. Date: Jul. 14, 2016

(65) Prior Publication Data
US 2017/0342341 A1 Nov. 30, 2017

(51) Int. Cl.
*C09K 8/36* (2006.01)
*C10M 145/36* (2006.01)
(Continued)

(52) U.S. Cl.
CPC ........... *C10M 145/36* (2013.01); *C09K 8/035* (2013.01); *C09K 8/36* (2013.01); *C10M 107/34* (2013.01);
(Continued)

(58) Field of Classification Search
CPC .................................. C09K 8/035; C09K 8/36
(Continued)

(56) References Cited

U.S. PATENT DOCUMENTS

| 5,106,516 A | 4/1992 | Mueller et al. |
| 5,194,422 A | 3/1993 | Mueller et al. |

(Continued)

FOREIGN PATENT DOCUMENTS

| CN | 107207952 A | 9/2017 |
| EP | 2319895 A1 | 5/2011 |

(Continued)

OTHER PUBLICATIONS

International Search Report dated Apr. 16, 2015 in PCT/EP2015/050162 (3 pages).

(Continued)

*Primary Examiner* — Ellen M McAvoy
(74) *Attorney, Agent, or Firm* — Philip P. McCann; Nexsen Pruet, PLLC

(57) ABSTRACT

The present invention relates to new ether carboxylic acids as high temperature stable rheology modifier, viscosifier, lubricant or emulsifier additives in oilfield and industrial applications. In particular, the invention relates to an ether carboxylic acid or a derivative thereof obtainable by reacting a branched polyol alkoxylate with a halogen carboxylic acid or a halogen carboxylic acid derivative. Further aspects of the invention relate to a lubricant composition comprising an ether carboxylic acid of the invention and the use of said ether carboxylic acid.

20 Claims, 1 Drawing Sheet

X = for example, $CH_2$ for ethylene oxide

(51) Int. Cl.
*C09K 8/035* (2006.01)
*C10M 107/34* (2006.01)

(52) U.S. Cl.
CPC ... *C09K 2208/34* (2013.01); *C10M 2209/108* (2013.01); *C10M 2209/1085* (2013.01); *C10N 2230/02* (2013.01); *C10N 2230/24* (2013.01)

(58) Field of Classification Search
USPC .......................................................... 507/136
See application file for complete search history.

(56) References Cited

U.S. PATENT DOCUMENTS

| | | | |
|---|---|---|---|
| 5,252,554 | A | 10/1993 | Mueller et al. |
| 5,254,531 | A | 10/1993 | Mueller et al. |
| 5,318,954 | A | 6/1994 | Mueller et al. |
| 5,318,956 | A | 6/1994 | Mueller et al. |
| 5,348,938 | A | 9/1994 | Mueller et al. |
| 5,403,822 | A | 4/1995 | Mueller et al. |
| 5,441,927 | A | 8/1995 | Mueller et al. |
| 5,461,028 | A | 10/1995 | Mueller et al. |
| 5,663,122 | A | 9/1997 | Mueller et al. |
| 5,755,892 | A | 5/1998 | Herold et al. |
| 5,846,601 | A | 12/1998 | Ritter et al. |
| RE36,066 | E | 1/1999 | Mueller et al. |
| 5,869,434 | A | 2/1999 | Mueller et al. |
| 6,022,833 | A | 2/2000 | Mueller et al. |
| 6,122,860 | A | 9/2000 | Von Tapavicza et al. |
| 6,165,946 | A | 12/2000 | Mueller et al. |
| 6,289,989 | B1 | 9/2001 | Mueller et al. |
| 6,350,788 | B1 | 2/2002 | Herold et al. |
| 6,482,777 | B2 | 11/2002 | Cain |
| 6,716,799 | B1 | 4/2004 | Mueller et al. |
| 6,806,235 | B1 | 10/2004 | Mueller et al. |
| 7,666,820 | B2 | 2/2010 | Mueller et al. |
| 7,741,248 | B2 * | 6/2010 | Mueller ............... C09K 8/36 507/136 |
| 7,959,743 | B2 | 6/2011 | Mueller et al. |
| 8,148,305 | B2 * | 4/2012 | Westfechtel ........ C09K 8/035 507/136 |
| 8,153,562 | B2 * | 4/2012 | Muller ................. C09K 8/28 507/136 |
| 8,193,125 | B2 * | 6/2012 | Muller ................. C09K 8/36 507/136 |
| 8,236,735 | B2 * | 8/2012 | Maker ................. C09K 8/32 507/136 |
| 8,763,724 | B2 * | 7/2014 | Muller ................. C09K 8/36 166/270.1 |
| 9,085,524 | B2 * | 7/2015 | Muller ................. C07C 67/03 |
| 9,745,502 | B2 * | 8/2017 | Muller ................. C09K 8/36 |
| 9,896,613 | B2 * | 2/2018 | Muller ................. C09K 8/28 |
| 9,982,182 | B2 * | 5/2018 | Muller ................. C09K 8/36 |
| 2007/0219097 | A1 | 9/2007 | Mueller et al. |
| 2007/0219098 | A1 | 9/2007 | Mueller et al. |
| 2010/0016180 | A1 | 1/2010 | Scoggins et al. |
| 2010/0258307 | A1 | 10/2010 | Muller et al. |
| 2010/0294501 | A1 | 11/2010 | Daute et al. |
| 2014/0018333 | A1 | 1/2014 | Schrage |
| 2014/0048258 | A1 | 2/2014 | Muller et al. |
| 2015/0210914 | A1 | 7/2015 | Müller et al. |
| 2016/0230069 | A1 | 8/2016 | Mäker et al. |

FOREIGN PATENT DOCUMENTS

| | | |
|---|---|---|
| ID | 2018/00385 | 1/2018 |
| WO | 2014015911 A1 | 1/2014 |

OTHER PUBLICATIONS

Maker et al., U.S. Appl. No. 15/533,698, filed Jun. 7, 2017.
Written Opinion dated Apr. 16, 2015 in PCT/EP2015/050162 (5 pages).

* cited by examiner

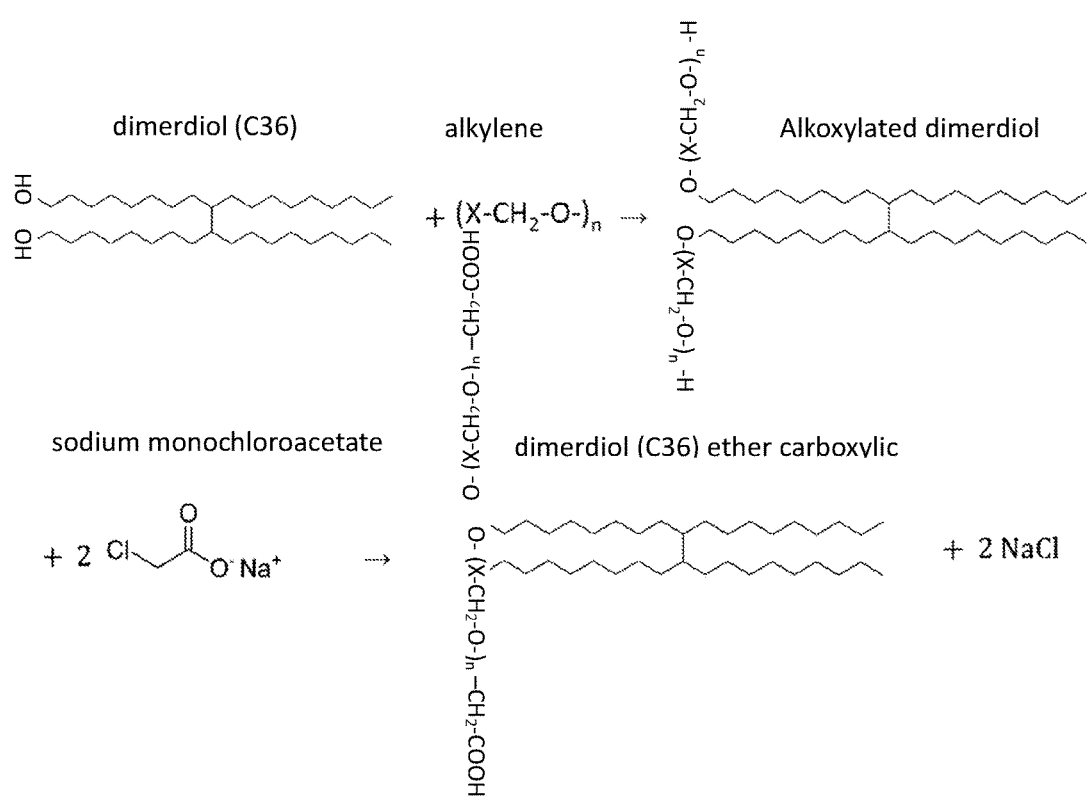

ADDITIVES FOR OILFIELD AND INDUSTRIAL APPLICATIONS

This application is a national stage application under 35 U.S.C. § 371 of International Application No. PCT/EP2015/050162 filed 7 Jan. 2015, the disclosure of which is expressly incorporated herein by reference.

The present invention relates to new ether carboxylic acids as highly temperature stable rheology modifier, viscosifier, lubricant or emulsifier additives in oilfield and industrial applications. In particular, the invention relates to an ether carboxylic acid or a derivative thereof obtainable by reacting a branched or linear polyol alkoxylate with a halogen carboxylic acid or a halogen carboxylic acid derivative. Further aspects of the invention relate to a lubricant composition comprising an ether carboxylic acid of the invention and the use of said ether carboxylic acid.

BACKGROUND

Drilling fluids generally contain certain additives. For example, such additives can be a viscosifier, a suspending agent, a dispersant, a thinner, an anti-balling additive, a lubricant, a wetting agent, a seepage control additive, a drilling enhancer, a penetration rate enhancer, a corrosion inhibitor, an acid, a base, a gelling agent and buffers.

Drilling fluids can be used in both oilfield applications and also in other industrial settings. During the drilling of oil and/or gas wells, a drill bit at the end of a rotating drill string, or at the end of a drill motor, is used to penetrate through geologic formations. During this operation, drilling mud is typically circulated through the drill string, out of the bit, and returned to the surface via the annular space between the drill pipe and the formation. Drilling mud serves numerous functions, including cooling and lubricating the drill string and drill bit, counterbalancing the pressures encountered in the formation using hydrostatic pressure, providing a washing action to remove the formation cuttings from the wellbore, and forming a friction reducing wall cake between the drill string and the wellbore.

Drilling fluids for sinking wells in rock and bringing up the rock cuttings are flowable systems which may be assigned to any of the following three classes: purely aqueous drilling fluids, oil-based drilling fluids, which are generally used as so-called invert emulsion fluids, in which the aqueous phase is heterogeneously distributed as a fine dispersion in the continuous oil phase. The third class of known drilling fluids is built up on water-based o/w emulsions, i.e. on liquid systems which contain a heterogeneous, finely disperse oil phase in a continuous aqueous phase.

In addition to the basic constituents of a drilling fluid such as the lubricant itself such systems may as mentioned above also contain a number of additives, depending on the specific type of application.

Unfortunately, many of such additives are sensitive to the heating that occurs during drilling and will therefore only have a limited life time when in use.

Accordingly, in particular for demanding applications a continuing need exists for drilling fluids in particular in the fields of oil and gas drilling applications that are effective as rheology modifier, viscosifier, lubricant and/or emulsifier additives that are resistant against high temperature degradation or decomposition.

SUMMARY

The present invention provides in a first aspect an ether carboxylic acid or a derivative thereof, wherein said ether carboxylic acid is obtainable by reacting (a) a polyol alkoxylate, obtainable by alkoxylating a polyol, with (b) a halogen carboxylic acid or a halogen carboxylic acid derivative;

and wherein said polyol is a C18-054 diol, a C18-054 triol or a mixture thereof; wherein said diol and said triol are branched or linear polyols comprising only primary OH-groups.

Also provided is a lubricant composition comprising
(i) an ether carboxylic acid or derivative thereof according to the invention; and optionally
(ii) an additive that is different from said ether carboxylic acid and said derivative thereof and that is selected from the group consisting of a lubricant, a viscosity modifier, a friction modifier, an ashless detergent, a cloud point depressant, a pour point depressant, a demulsifier, a flow improver, an anti-static agent, an ashless antioxidant, an antifoam agent, a corrosion inhibitor, an antiwear agent, a seal swell agent, a lubricity aid, an antimisting agent, an organic solvent, a gel-breaking surfactant and mixtures thereof.

A further aspect of the invention relates to the use of an ether carboxylic acid or a derivative thereof of the invention as a rheology modifier, viscosifier, lubricant or emulsifier.

BRIEF DESCRIPTION OF THE DRAWING

FIG. 1 shows a general reaction scheme of the ether carboxylic acid of the present invention.

DETAILED DESCRIPTION OF THE INVENTION

Before the present invention is described in detail below, it is to be understood that this invention is not limited to the particular methodology, protocols and reagents described herein as these may vary. It is also to be understood that the terminology used herein is for the purpose of describing particular embodiments only, and is not intended to limit the scope of the present invention which will be limited only by the appended claims. Unless defined otherwise, all technical and scientific terms used herein have the same meanings as commonly understood by one of ordinary skill in the art.

In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Some documents are cited throughout the text of this specification. Each of the documents cited herein (including all patents, patent applications, scientific publications, manufacturer's specifications, instructions, DIN norms etc.), whether supra or infra, are hereby incorporated by reference in their entirety. Nothing herein is to be construed as an admission that the invention is not entitled to antedate such disclosure by virtue of prior invention.

The present invention provides novel ether carboxylic acid and derivatives thereof. It was unexpectedly found that the ether carboxylic acid and derivatives thereof of the invention are useful as viscosifier, lubricant or emulsifier in lubricant compositions.

Accordingly, in a first aspect the invention provides ether carboxylic acid or a derivative thereof, wherein said ether carboxylic acid is obtainable by reacting (a) a polyol alkoxylate, obtainable by alkoxylating a polyol, with (b) a halogen carboxylic acid or a halogen carboxylic acid derivative;

and wherein said polyol is a C18-054 diol, a C18-054 triol or a mixture thereof; wherein said diol and said triol are branched or linear polyols comprising only primary OH-groups. Most preferably, said polyol is a branched C18-C54 alkyl diol, a branched C18-C54 alkyl triol or a mixture thereof.

The ethers of the invention can be obtained utilizing conventional ether production procedures such as those described in the examples below.

Preferably, the ether carboxylic acid is an aliphatic ether carboxylic acid. The ether carboxylic acid is in a preferred embodiment an aliphatic ether polycarboxylic acid. In a further preferred embodiment the ether carboxylic acid is an ether monocarboxylic acid, an ether dicarboxylic acid, an ether tricarboxylic acid, or a mixture thereof.

In a preferred embodiment, the derivative is selected from the group consisting of a salt of said carboxylic acid, an ester of said carboxylic acid and an amide of said carboxylic acid.

As mentioned said polyol alkoxylate is obtainable by alkoxylating said C18-054 diol or C18-054 triol. In preferred embodiments the polyol is a C26-C42 diol or C39-054 triol and more preferably a C34-C38 diol or C39-054 triol. Thereby, in further preferred embodiments the polyol is a C18-054 dimer diol or a C18-054 trimer triol, more preferably a C26-C42 dimer diol or a C39-054 trimer triol or even more preferably a C34-C38 dimer diol or a C39-054 trimer triol. Most preferably, said polyol alkoxylate is obtainable by alkoxylating a C36 dimer diol, a C54 trimer triol, or a mixture thereof. Dimer diols and trimer triols are well known in the art. They can be obtained, for example, by dimerizing or trimerizing, respectively, unsaturated fatty acids and then reducing the dimerized or trimerized fatty acid product (e.g. via hydrogenation) to obtain the respective dimer diol or trimer triol. Dimer diols are already known in the prior art (see for example US 20140018333 A1).

Dimer diols can be produced for example as shown in the following example where a C36 dimer diol is synthesized starting from linoleic acid and oleic acid:

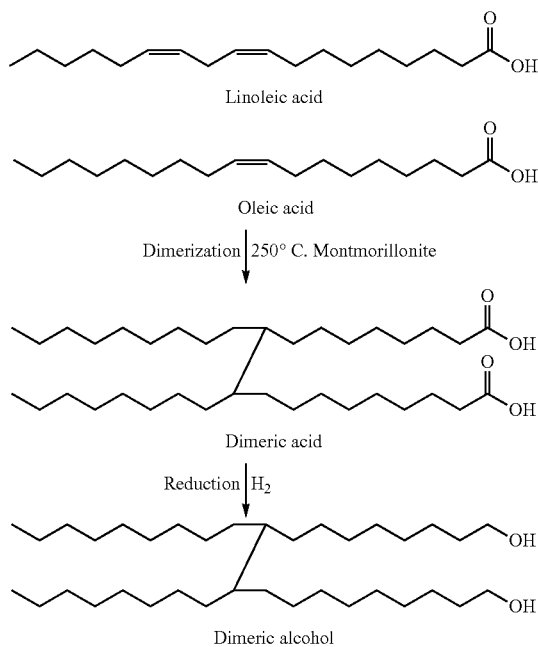

In a preferred embodiment of the ether carboxylic acid or derivative thereof according to the invention, the alkoxylated polyol comprises in total at most 50 alkoxy (e.g. ethoxy, propoxy, butyloxy radicals, or a mixture thereof) radicals. In a preferred embodiment, the alkoxylated polyol comprises in total at most 10, 20 or at most 30 alkoxy (e.g. ethoxy, propoxy, butyloxy radicals, or a mixture thereof) radicals. In a preferred embodiment, the polyol is alkoxylated with ethylene oxide and/or propylene oxide. Accordingly, in a preferred embodiment of the ether carboxylic acid or derivative thereof according to the invention said polyol is ethoxylated and/or propoxylated.

In a preferred embodiment of the ether carboxylic acid or derivative thereof according to the invention the polyol is an aliphatic alcohol, optionally comprising a ring structure, or an aromatic alcohol. Preferably, said polyol has a general formula selected from the following group:

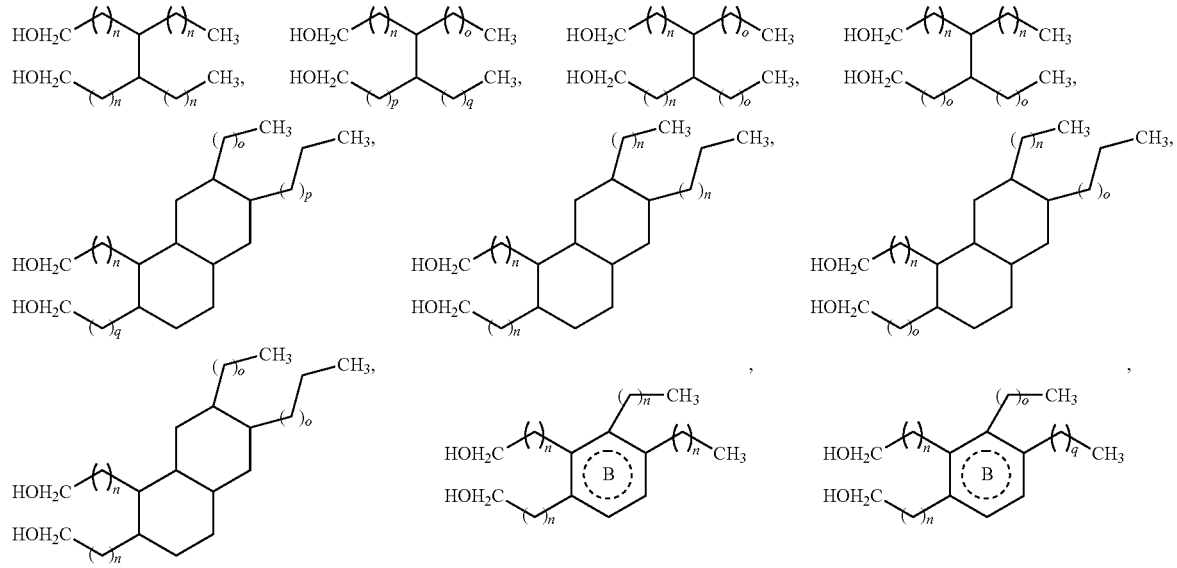

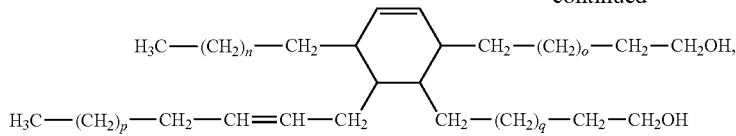

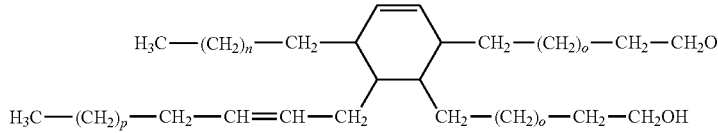

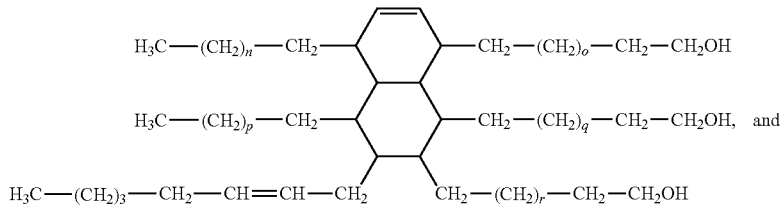

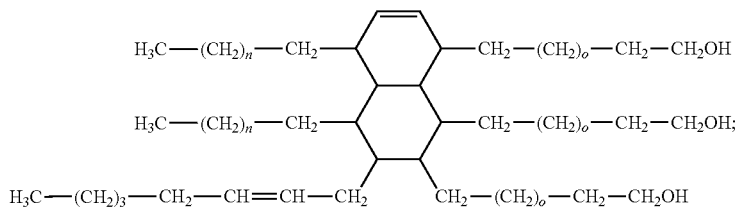

wherein
n, o, p, q and r are each individually selected from an integer of between 3 and 12; and
ring B can be aromatic or aliphatic.

In the above outlined embodiments, it is more preferred that
n is 4 or 7;
o is 5, 7 or 8;
p is 3 or 4; and
q is 5.

In an even more preferred embodiment of the ether carboxylic acid or derivative thereof according to the invention said polyol is an alkyl polyol. Preferably, said alkyl polyol comprises or consists of the following dimer diol:

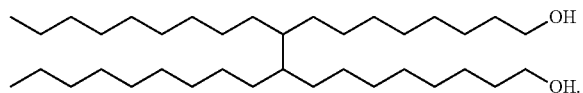 [SMILES: CCCCCCCCCC(CCCCCCCCO)C(CCCCCCCCC)CCCCCCCCO]

As mentioned, the ether carboxylic acid of the invention is obtainable by reacting said polyol alkoxylate with said halogen carboxylic acid or a halogen carboxylic acid derivative. In a referred embodiment, the halogen carboxylic acid is selected from sodium monochloroacetate, sodium 1-monochloropropionate and sodium 2-monochloropropionate.

In a preferred embodiment the ether carboxylic acid of the invention has the following general structure:

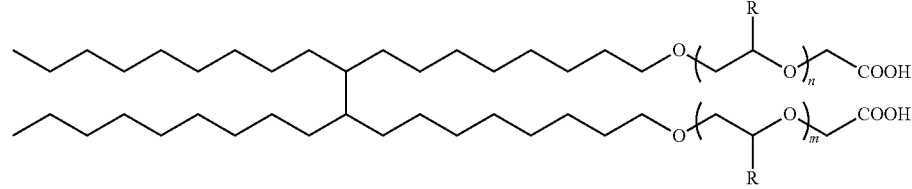

wherein
the total of n+m is between 3 and 10 and preferably 6 and R is methyl, ethyl or hydrogen.

In a further embodiment, the ether carboxylic acid of the invention has the general structure shown in FIG. 1.

In a more preferred embodiment the ether carboxylic acid of the invention has the following general structure:

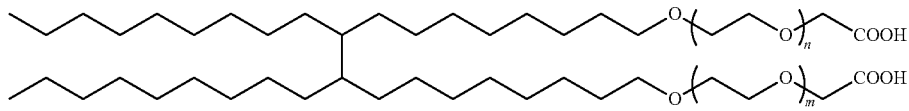

wherein the total of n+m is between 3 and 10 and preferably 6.

Unexpectedly, the ether carboxylic acid and derivative thereof according to the invention was shown to be a rheology modifier, viscosifier, lubricant and emulsifier.

Accordingly, in a further aspect, the invention provides a lubricant composition comprising
(i) an ether carboxylic acid or derivative thereof of the invention; and optionally
(ii) an additive that is different from said ether carboxylic acid and said derivative thereof and that is selected from the group consisting of a lubricant, a viscosity modifier, a friction modifier, an ashless detergent, a cloud point depressant, a pour point depressant, a demulsifier, a flow improver, an anti-static agent, an ashless antioxidant, an antifoam agent, a corrosion inhibitor, an antiwear agent, a seal swell agent, a lubricity aid, an antimisting agent, an organic solvent, a gel-breaking surfactant and mixtures thereof.

Since the ether carboxylic acid or derivative thereof of the invention is a much more robust additive that effectively resists also high temperature, it can advantageously be used as an additive in a rather small amount. For example, in a preferred embodiment, the ether carboxylic acid or derivative thereof of the invention is present in said lubricant composition in an amount of between 0.001 wt % and 3 wt %, in a further preferred embodiment in an amount of between 0.001 wt % and 1 wt % and in another embodiment in the range from between 0.05 wt % and 0.8 wt % based on the total weight of the lubricant composition.

In the context of the lubricant composition according to the invention, the mentioned viscosity modifier is preferably selected from the group consisting of hydrogenated copolymers of styrene-butadiene, ethylene-propylene copolymers, polyisobutenes, hydrogenated styrene-isoprene polymers, hydrogenated isoprene polymers, polymethacrylates, polyacrylates, polyalkyl styrenes, alkenyl aryl conjugated diene copolymers, polyolefins, esters of maleic anhydride-styrene copolymers, functionalized polyolefins, ethylene-propylene copolymers functionalized with the reaction product of maleic anhydride and an amine, polymethacrylate functionalized with an amine, styrene-maleic anhydride copolymers reacted with an amine, polymethacrylate polymers, esterified polymers, esterified polymers of a vinyl aromatic monomer and an unsaturated carboxylic acid or derivative thereof, olefin copolymers, ethylene-propylene copolymer, polyisobutylene or mixtures thereof.

A gel breaking surfactant is preferably selected from the group consisting of glycerol monooleate, tall oil fatty acid, linoleic and stearic acids and derivatives thereof, non-ionic surfactants, and mixtures thereof.

Ashless antioxidants preferably include alkyl-substituted phenols such as 2,6-di-tertiary butyl-4-methyl phenol, phenate sulfides, phosphosulfurized terpenes, sulfurized esters, aromatic amines, diphenyl amines, alkylated diphenyl amines and hindered phenols, bis-nonylated diphenylamine, nonyl diphenylamine, octyl diphenylamine, bis-octylated diphenylamine, bis-decylated diphenylamine, decyl diphenylamine and mixtures thereof. Hindered phenols include but are not limited to 2,6-di-tert-butylphenol, 4-methyl-2,6-di-tert-butylphenol, 4-ethyl-2,6-di-tert-butylphenol, 4-propyl-2,6-di-tert-butyl phenol, 4-butyl-2,6-di-tert-butylphenol 2,6-di-tert-butylphenol, 4-pentyl-2-6-di-tert-butylphenol, 4-hexyl-2,6-di-tert-butylphenol, 4-heptyl-2,6-di-tert-butylphenol, 4-(2-ethylhexyl)-2,6-di-tert-butylphenol, 4-octyl-2,6-di-tert-butylphenol, 4-nonyl-2,6-di-tert-butylphenol, 4-decyl-2,6-di-tert-butylphenol, 4-undecyl-2,6-di-tert-butylphenol, 4-dodecyl-2,6-di-tert-butylphenol, 4-tridecyl-2,6-di-tert-butylphenol, 4-tetradecyl-2,6-di-tert-butylphenol, methylene-bridged sterically hindered phenols include but are not limited to 4,4-methylenebis(6-tert-butyl-o-cresol), 4,4-methylenebis(2-tert-amyl-o-cresol), 2,2-methylenebis(4-methyl-6-tert-butylphenol), 4,4-methylene-bis(2,6-di-tertbutylphenol) and mixtures thereof. Another example of an ashless antioxidant is a hindered, ester-substituted phenol, which can be prepared by heating a 2,6-dialkylphenol with an acrylate ester under based conditions, such as aqueous KOH. Ashless antioxidants may be used alone or in combination. The antioxidants are typically present in the range of about 0 wt % to about 95 wt %, in one embodiment in the range from about 0.01 wt % to 95 wt % and in another embodiment in the range from about 1 wt % to about 70 wt % and in another embodiment in the range from about 5 wt % to about 60 wt % based on the total weight of the lubricant composition.

The anti-wear agents include a sulfur or chlorosulphur extreme pressure (EP) agent, a chlorinated hydrocarbon EP agent, or a phosphorus EP agent, or mixtures thereof. Examples of such EP agents are amine salts of phosphorus acid, chlorinated wax, organic sulfides and polysulfides, such as benzyldisulfide, bis-(chlorobenzyl) disulfide, dibutyl tetrasulfide, sulfurized sperm oil, sulfurized methyl ester of oleic acid sulfurized alkylphenol, sulfurized dipentene, sulfurized terpene, and sulfurized Diels-Alder adducts; phosphosulfurized hydrocarbons, such as the reaction product of phosphorus sulfide with turpentine or methyl oleate, phosphorus esters such as the dihydrocarbon and trihydrocarbon phosphate, i.e., dibutyl phosphate, diheptyl phosphate, dicyclohexyl phosphate, pentylphenyl phosphate; dipentylphenyl phosphate, tridecyl phosphate, distearyl phosphate and polypropylene substituted phenol phosphate, metal thiocarbamates, such as zinc dioctyldithiocarbamate and barium heptylphenol diacid, such as zinc dicyclohexyl phosphorodithioate and the zinc salts of a phosphorodithioic acid combination may be used and mixtures thereof. In one embodiment the antiwear agent/extreme pressure agent comprises an amine salt of a phosphorus ester acid. The amine salt of a phosphorus ester acid includes phosphoric acid esters and salts thereof; dialkyldithiophosphoric acid esters and salts thereof; phosphites; and phosphorus-containing carboxylic esters, ethers, and amides; and mixtures thereof. In one embodiment the phosphorus compound further comprises a sulfur atom in the molecule. In one embodiment the amine salt of the phosphorus compound is ashless, i.e., metal-free (prior to being mixed with other components). The amines which may be suitable for use as the amine salt include primary amines, secondary amines, tertiary amines, and mixtures thereof.

Antifoam agents include organic silicones such as poly dimethyl siloxane, poly ethyl siloxane, polydiethyl siloxane, polyacrylates and polymethacrylates, trimethyl-triflouropropylmethyl siloxane and the like. An antifoam agent may be used in the range of about 0 wt % to about 20 wt %, in one embodiment in the range of about 0.02 wt % to about 10 wt % and in another embodiment in the range of 0.05 wt % to about 2.5 wt % based on the weight of the lubricant composition.

A suitable friction modifier may preferably be an organomolybdenum compound, including molybdenum dithiocarbamate. In one embodiment, the friction modifier is a phosphate ester or salt including a monohydrocarbyl, dihydrocarbyl or a trihydrocarbyl phosphate, wherein each hydrocarbyl group is saturated. Each hydrocarbyl group may contain from about 8 to about 30, or from about 12 up to about 28, or from about 14 up to about 24, or from about 14 up to about 18 carbons atoms. In another preferred embodiment, the hydrocarbyl groups are alkyl groups. Examples of hydrocarbyl groups include tridecyl, tetradecyl, pentadecyl, hexadecyl, heptadecyl, octadecyl groups and mixtures thereof. If the friction modifier is a phosphate salt, the phosphate salt may for example be prepared by reacting an acidic phosphate ester with an amine compound or a metallic base to form an amine or a metal salt. The amines may be monoamines or polyamines. In one embodiment, the friction modifier is a phosphite and may be a monohydrocarbyl, dihydrocarbyl or a trihydrocarbyl phosphite, wherein each hydrocarbyl group is saturated. In several embodiments each hydrocarbyl group may independently contain from about 8 to about 30, or from about 12 up to about 28, or from about 14 up to about 24, or from about 14 up to about 18 carbons atoms. In one embodiment, the hydrocarbyl groups are alkyl groups. Examples of hydrocarbyl groups include tridecyl, tetradecyl, pentadecyl, hexadecyl, heptadecyl, octadecyl groups and mixtures thereof. In one embodiment, the friction modifier is a fatty imidazoline comprising fatty substituents containing from 8 to about 30, or from about 12 to about 24 carbon atoms. A suitable fatty imidazoline includes those described in U.S. Pat. No. 6,482,777. The friction modifiers can be used alone or in combination. The friction reducing agents are preferably present in the range of about 0 wt % to 60 wt %, or from about 0.25 wt % to about 40 wt %, or from about 0.5 wt % to about 10 wt % based on the total weight of the lubricant composition.

Said anti-misting agents include very high (>=100,000 Mn) polyolefins such as 1.5 Mn polyisobutylene (for example the material of the trades name Vistanex®), or polymers containing 2-(N-acrylamido), 2-methyl propane sulfonic acid (also known as AMPS®) or derivatives thereof. The anti-misting agents can be used alone or in combination. The anti-misting agents are present in the range of about 0 wt % to 10 wt %, or from about 0.25 wt % to about 10 wt %, or from about 0.5 wt % to about 2.5 wt % based on the total weight of the lubricant composition.

The corrosion inhibitors that can be used according to the invention include alkylated succinic acids and anhydrides derivatives thereof, organo phosphonates and the like. The corrosion inhibitors may be used alone or in combination. The rust inhibitors are present in the range of about 0 wt % to about 20 wt %, and in one embodiment in the range from about 0.0005 wt % to about 10 wt % and in another embodiment in the range from about 0.0025 wt % to about 2.5 wt % based on the total weight of the lubricant composition.

Demulsifiers usable in a lubricant composition of the invention include polyethylene and polypropylene oxide copolymers and the like. The demulsifiers may be used alone or in combination. The demulsifiers are preferably present in the range of about 0 wt % to about 20 wt %, or from about 0.0005 wt % to about 10 wt %, or from about 0.0025 wt % to about 2.5 wt % based on the total weight of the lubricant composition.

Said lubricity aids include glycerol mono oleate, sorbitan mono oleate and the like. The lubricity aids may be used alone or in combination. The lubricity aids are preferably present in the range of about 0 wt % to about 50 wt %, or from about 0.0005 wt % to about 25 wt %, or from about 0.0025 wt % to about 10 wt % based on the total weight of the lubricant composition.

The flow improvers mentioned in the context of the lubricant composition of the invention include ethylene vinyl acetate copolymers and the like. The flow improvers may be used alone or in combination. The flow improvers are preferably present in the range of about 0 wt % to about 50 wt %, or from about 0.0005 wt % to about 25 wt %, or from about 0.0025 wt % to about 5 wt % based on the total weight of the lubricant composition.

Said cloud point depressants include alkylphenols and derivatives thereof, ethylene vinyl acetate copolymers and the like. The cloud point depressants may be used alone or in combination. The cloud point depressants are preferably present in the range of about 0 wt % to about 50 wt %, or from about 0.0005 wt % to about 25 wt %, or from about 0.0025% to about 5 wt % based on the total weight of the lubricant composition.

The pour point depressants include alkylphenols and derivatives thereof, ethylene vinyl acetate copolymers and the like. The pour point depressant may be used alone or in combination. The pour point depressant are for example present in the range of about 0 wt % to about 50 wt %, or from about 0.0005 wt % to about 25 wt %, or from about 0.0025 wt % to about 5 wt % based on the total weight of the lubricant composition.

The seal swell agents include organo sulfur compounds such as thiophene, 3-(decyloxy)tetrahydro-1,1-dioxide, phthalates and the like. The seal swell agents may be used alone or in combination. The seal swell agents are for example present in the range of about 0 wt % to about 50 wt %, or from about 0.0005 wt % to about 25 wt %, or from about 0.0025 wt % to about 5 wt % based on the total weight of the lubricant composition.

Suitable antistatic agents include for example quaternary ammonium chlorides including alkyl benZyl ammonium chlorides and ethoxylated tertiary amine methyl ammonium chlorides; diammonium ethosulfates; ethoxylated alkyl amines (propyl to octadecyl, i.e. C3 to C18), soya and/or talloW amines; ethoxylated amine oxides such as ethoxylated alkyl oxypropyl amine oxides (methyl to C18); trimethyl alkyl ammonium chlorides such as cetyl trimethyl ammonium chlorides; a quaternary compound Which is a reaction product of an aliphatic tertiary amine and methyl chloride; an ethoxylated amine comprising a fatty amine reacted With ethylene oxide; and an alkylated phenol such as 2,6-dibutyl-4-nonyl phenol.

Preferably, the lubricant composition according to the invention comprises a lubricant selected from the group consisting of a paraffin, an ester, canola oil, castor oil, palm oil, sunflower seed oil, rapeseed oil, Tall oil, lanolin, olefin, polyalkylene glycol (PAG), a phosphate ester, an alkylated naphthalene (AN), a silicate ester and an ionic fluid.

Drilling fluids can be used in geotechnical engineering but also in other fields. When used in geotechnical engineering, a drilling fluid or mud is a specially designed fluid that is circulated through a wellbore as the wellbore is being drilled to facilitate the drilling operation. Drilling operations in general can concern oil and gas production or the generation of drilling holes useful in exploiting geothermal activity. The various functions of a drilling fluid include removing drill cuttings from the wellbore, cooling and lubricating the drill bit, aiding in support of the drill pipe and drill bit, and providing a hydrostatic head to maintain the integrity of the wellbore walls and prevent well blowouts.

An important property of the drilling fluid is its rheology, and specific rheological parameters are intended for drilling and circulating the fluid through the well bore. The fluid should be sufficiently viscous to suspend barite and drilled cuttings and to carry the cuttings to the well surface. However, the fluid should not be so viscous as to interfere with the drilling operation.

The ether carboxylic acid or a derivative thereof of the invention unexpectedly was shown to be an effective rheology modifier, viscosifier, lubricant and emulsifier that can also be used in an oil drilling fluid. Accordingly, in a preferred embodiment of the lubricant composition according to the invention said lubricant composition is a drilling fluid (for example used for oil or gas drilling) or a metal working fluid.

Preferably, the lubricant composition of the invention is a water-in-oil or an oil-in-water emulsion and whereby preferably the composition comprises from 2 to 98% water and from 2 to 98% organic phase based on the volume of the lubricant composition. Most preferably, the lubricant composition of the invention is a water-in-oil lubricant composition, i.e. comprises a continuous oil phase. If the lubricant composition of the invention is a water-in-oil lubricant composition it comprises preferably more than 50 vol % of organic phase, more preferably at least 60 vol % and most preferably at least 70 vol % of the organic phase based on the total volume of the lubricant composition. If the lubricant composition of the invention is an oil-in-water lubricant composition it comprises preferably more than 50 vol % of water, more preferably at least 60 vol % and most preferably at least 70 vol % of water based on the total volume of the lubricant composition.

"Water phase" as used herein means water which optionally comprises one or more dissolved water soluble compound. The water is preferably present in the lubricant composition of the invention in quantities of at least about 0.5% by weight based on the weight of the emulsion. In a preferred embodiment, however, the water-in-oil lubricant composition contain between 5 and 30 wt.-% water based on the weight of the lubricant composition. The water in the lubricant composition of the type described herein preferably contains electrolytes to equalize the osmotic gradient between the drilling fluid and the formation water, calcium and/or sodium salts representing the preferred electrolytes. $CaCl_2$ in particular may be used. However, other salts from the group of alkali metals and/or alkaline earth metals, for example potassium acetates, caesium salts, bromides (such as calciumbromide) and/or formates, are also suitable.

In a further aspect the invention relates to the use of the ether carboxylic acid or a derivative thereof of the invention as a rheology modifier, viscosifier, lubricant or emulsifier.

In a preferred embodiment of the use the ether carboxylic acid or a derivative thereof of the invention is used as a rheology modifier, viscosifier additive, as a lubricant additive or as an emulsifier additive for a lubricant selected from the group consisting of engine oil, oil drilling fluid, hydraulic oil, compressor oil, gear oil, bearing oil, low temperature lubricant and turbine oil.

The use of the ether carboxylic acids and derivatives thereof according to the invention in an oil drilling fluid leads on the one hand to stable emulsions and, on the other hand, to an improvement in the filtrate values of the drilling systems. In addition, the rheology of the drilling fluid is positively influenced. It can be of advantage to use the ether carboxylic acid and derivatives thereof according to the present invention as sole emulsifier in drilling fluid systems (preferably in water-in-oil drilling fluids). However, the ether carboxylic acid and derivatives thereof of the invention can also be combined with other ether carboxylic acids or further emulsifiers such as an emulsifier selected from the group consisting of an ether carboxylic acid ester, a fatty acid amine, an amidoamine, a fatty alcohol ethoxylate, a fatty acid ethoxylate, an alkylpolyglycoside and a fatty alcohol. Emulsifiers capable of forming water in oil emulsions are preferred as further emulsifiers for this purpose.

The most preferred use of the ether carboxylic acids and derivatives thereof according to the invention is the use as a rheology modifier, viscosifier in oil drilling fluids.

Various modifications and variations of the invention will be apparent to those skilled in the art without departing from the scope of the invention. Although the invention has been described in connection with specific preferred embodiments, it should be understood that the invention as claimed should not be unduly limited to such specific embodiments.

The following examples are merely illustrative of the present invention and should not be construed to limit the scope of the invention as indicated by the appended claims in any way.

EXAMPLES

Example 1: Production of Ether Carboxylic Acid

A general reaction scheme is shown in FIG. 1.

In the following, a general method for producing an ether carboxylic acid of the invention is outlined.

| Material used: | 374.1 g = 1.0 Apui [OH] | C36 dimerdiol (Pripol 2030) + 6 EO |
| --- | --- | --- |
| | 122.3 g = 1.05 Mol | sodium-monochloroacetate |
| | 44.0 g = 1.065 Mol | NaOH |
| | 364.0 g | $H_2O$ |
| | 121.2 g = 1.064 Mol | HCl 32% |
| | "EO" means ethylene oxide | |
| Equipment: a) | 2l stirring apparatus, contact thermometer having a $N_2$-connector, steam bath separating funnel | |
| b) | 1l stirring apparatus with a distillation bridge, contact thermometer, water jet pump; funnel with filter flask | |

The ethoxylate was mixed at 45° C. with the sodium monochloroacetate and the resulting thick suspension was stirred at 45-58° C. under $N_2$ for 15 minutes. NaOH was added in four portions of 11 g each and stirred each time for 45 minutes. The temperature was maintained at 56-58° C.

During this time the reaction was slightly exothermic only during the last hour and the mixture was getting thicker.

Next, the mixture was stirred for 3 h at 70-77° C. while the temperature could be held mainly without active heating. Also after the addition of hydrochloric acid the mixture remained thick and was heated to 90° C. while slowly stirring the composition.

The product was transferred to a separating funnel and kept for 30 minutes over a steam bath to separate the mixture. About 380 ml of a clear aqueous solution could be separated and was kept for 15 more minutes over the steam bath for a second round of separation. After removal of about 100 ml of aqueous phase the organic phase was dried to 104° C. under water jet vacuum. About 40-50 ml water was removed this way.

At 80° C. Celatom was added and filtered slowly through a preheated suction filter.

Yield: 374 g of pale yellow, clear, viscous liquid.

Analysis: acid value: 77.8, saponification value: 94.6, hydroxyl value: 43.1, $H_2O$: 0.0%

Example 2: Production of Water-in-Oil Drilling Fluid

To test the technical teaching disclosed here, drilling fluids with the following general composition were prepared:

| Ingredient/Property | Amount (gram) | Amount (gram) | Amount (gram) |
|---|---|---|---|
| Composition | A | B | C |
| XP 07 (paraffin) | | 146.3 | |
| Cross-linked polymer | | 1-5 | |
| $CaOH_2$ | | 1-6 | |
| Terradril EM 1122 | | 4-10 | |
| Water | | 77.2 | |
| $CaCl_2 \cdot 2H_2O$ | | 40 | |
| $BaSO_4$ | | 156 | |
| Hymod Prima Clay | | 20 | |
| C36 dimer fatty acid | 0 | 2.5 | 0 |
| Ether carboxylic acid according to example 1 | 0 | 0 | 2.5 |
| Weight | 457 | 459.5 | 459.5 |
| Vol | 351.9 | 354.4 | 354.4 |
| Mud Wt, ppg | 10.8 | 10.8 | 10.8 |
| Oil/water ratio | 72/28 | 72/28 | 72/28 |

To obtain a suitable emulsion the mixing can be carried out using typical mixers well known in the art such as a Hamilton Beach or a Silverston mixer, following manufacturer's instructions.

Example 3: Determining Product Characteristics

Next, the rheological characteristics including the fluids-plastic viscosity (PV), yield point (YP) and gel strength (gels 10"/10') after 10 seconds and 10 minutes were determined with a Fann Model 35A rheometer for systems A through C.

The drilling fluid of systems A through C were also tested in a Roller Oven overnight at a temperature of 121° C. (250° F.) (after hot rolling=AHR and before hot rolling=BHR in the Table). All results are set out in the following table:

| | System | | | | | |
|---|---|---|---|---|---|---|
| | A | | B | | C | |
| | BHR | AHR 250° F. | BHR | AHR 250° F. | BHR | AHR 250° F. |
| measuring temperature | 120 F. | 120 F. | 120 F. | 120 F. | 120 F. | 120 F. |
| 600 rpm (skt) | 31 | 35 | 56 | 42 | 82 | 79 |
| 300 rpm | 18 | 19 | 42 | 27 | 57 | 52 |
| 200 rpm | 13 | 13 | 36 | 20 | 47 | 42 |
| 100 rpm | 8 | 8 | 29 | 14 | 35 | 31 |
| 6 rpm | 2 | 2 | 18 | 4 | 20 | 23 |
| 3 rpm | 1 | 1 | 17 | 3 | 18 | 21 |
| PV (cP) | 13 | 16 | 14 | 15 | 25 | 27 |
| YP (lb/100 $ft^2$) | 5 | 3 | 28 | 12 | 32 | 25 |
| Gels 10" (lb/100 $ft^2$) | 1 | 2 | 20 | 5 | 30 | 27 |
| Gels 10' (lb/100 $ft^2$) | 2 | 1 | 25 | 7 | 32 | 29 |
| Emulsion stability (ES) | 610 | 430 | 810 | 590 | 890 | 650 |

It can be seen from the above data that the ether carboxylic acid in system (C) shows that it acts as a viscosity increaser. Furthermore, as is evident also from the yield point values the yield point does not significantly decrease even after hot roll upon adding the ether carboxylic acid as additive. That means that the additive is also heat resistant. Also, unexpectedly, addition of the ether carboxylic acid of the invention also increases the emulsion stability as shown in the above table.

The invention claimed is:

1. An ether carboxylic acid, wherein said ether carboxylic acid is obtainable by reacting
   (a) a polyol alkoxylate, obtainable by alkoxylating a polyol, with
   (b) a halogen carboxylic acid or a halogen carboxylic acid derivative;
   wherein said polyol is a C18-C54 diol or a C18-C54 triol or a mixture thereof; and
   wherein said diol and said triol are branched polyols comprising only primary OH-groups, wherein the halogen carboxylic acid or a halogen carboxylic acid derivative is selected from the group consisting of a salt of said carboxylic acid, an ester of said carboxylic acid, and an amide of said carboxylic acid.

2. The ether carboxylic acid according to claim 1, wherein the ether carboxylic acid is a aliphatic ether polycarboxylic acid.

3. The ether carboxylic acid according to claim 1, wherein the ether carboxylic acid is an ether monocarboxylic acid, an ether dicarboxylic acid or an ether tricarboxylic acid.

4. The ether carboxylic acid according to claim 1, wherein the diol is a C36 dimer diol and said triol is a C54 trimer triol.

5. The ether carboxylic acid according to claim 1, wherein the alkoxylated polyol comprises in total at most 50 alkoxy radicals.

6. The ether carboxylic acid according to claim 1, wherein said polyol is ethoxylated and/or propoxylated.

7. The ether carboxylic acid according to claim 1, wherein the polyol is an aliphatic alcohol, optionally comprising a ring structure, or an aromatic alcohol.

8. The ether carboxylic acid according to claim 1, wherein the polyol has a general formula selected from the following group:

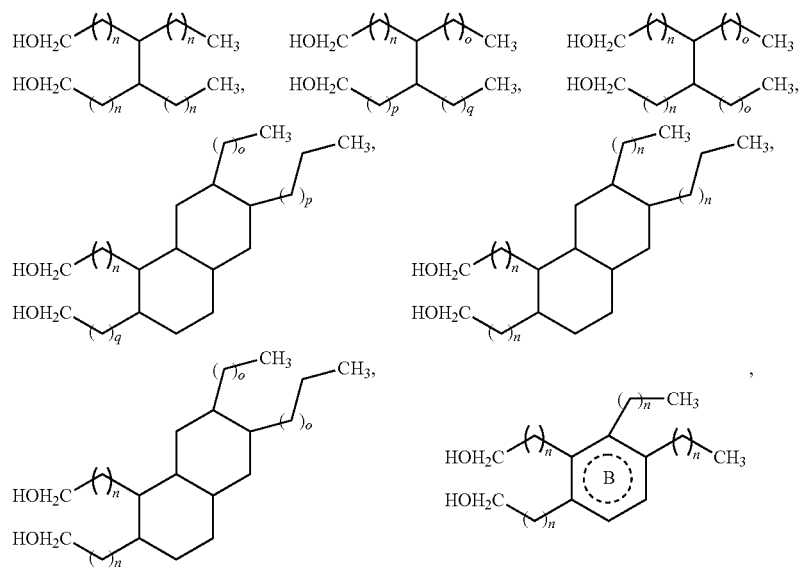
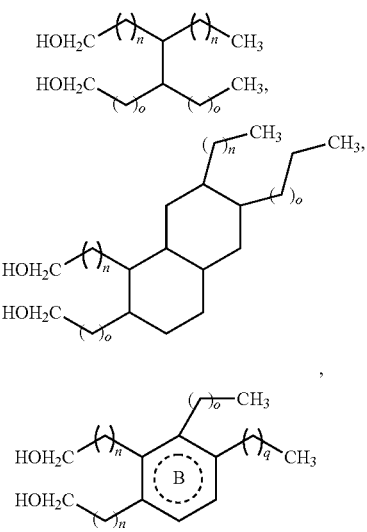

wherein n, o, p, q and r are each individually selected from an integer of between 3 and 12; and ring B can be aromatic or aliphatic.

9. The ether carboxylic acid according to claim 8, wherein n is 4 or 7;

o is 5, 7 or 8;

p is 3 or 4; and q is 5.

10. The ether carboxylic acid according to claim 8, wherein said polyol comprises or consists of the following dimer diol:

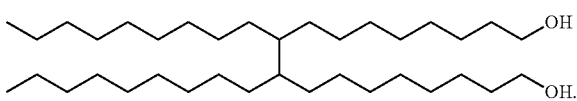 [SMILES: CCCCCCCCCC(CCCCCCCCO)C(CCCCCCCCC)CCCCCCCCO]

11. The ether carboxylic acid according to claim 1, wherein the halogen carboxylic acid is selected from sodium monochloroacetate, sodium 1-monochloropropionate and sodium 2-monochloropropionate.

12. A lubricant composition comprising
  (i) an ether carboxylic acid as defined in claim 1; and optionally
  (ii) an additive that is different from said ether carboxylic acid and said derivative thereof and that is selected from the group consisting of a lubricant, a viscosity modifier, a friction modifier, an ashless detergent, a cloud point depressant, a pour point depressant, a demulsifier, a flow improver, an anti-static agent, an ashless antioxidant, an antifoam agent, a corrosion inhibitor, an antiwear agent, a seal swell agent, a lubricity aid, an antimisting agent, an organic solvent, a gel-breaking surfactant and mixtures thereof.

13. The lubricant composition according to claim 12, wherein said lubricant composition comprises a lubricant selected from the group consisting of a paraffin, an ester, canola oil, castor oil, palm oil, sunflower seed oil, rapeseed oil, Tall oil, lanolin, olefin, polyalkylene glycol (PAG), a phosphate ester, an alkylated naphthalene (AN), a silicate ester and an ionic fluid.

14. The lubricant composition according to claim 12, wherein said lubricant composition is an oil drilling fluid.

15. A lubricant comprising an ether carboxylic acid as defined in claim 1.

16. The lubricant according to claim 15, wherein the ether carboxylic acid or a derivative thereof is used as a rheology modifier, viscosifier additive, as a lubricant additive or as an emulsifier additive for a lubricant selected from the group consisting of engine oil, oil drilling fluid, hydraulic oil, compressor oil, gear oil, bearing oil, low temperature lubricant and turbine oil.

17. The ether carboxylic acid according to claim 2, wherein the ether carboxylic acid is an ether monocarboxylic acid, an ether dicarboxylic acid or an ether tricarboxylic acid.

18. The ether carboxylic acid according to claim 2, wherein the diol is a C36 dimer diol and said triol is a C54 trimer triol.

19. The ether carboxylic acid according to claim 2, wherein the alkoxylated polyol comprises in total at most 50 alkoxy radicals.

20. The ether carboxylic acid according to claim 2, wherein said polyol is ethoxylated and/or propoxylated.

* * * * *